Feb. 23, 1937.  M. R. HUC  2,071,878
CINEMATOGRAPHIC APPARATUS
Filed Oct. 18, 1933   2 Sheets-Sheet 1
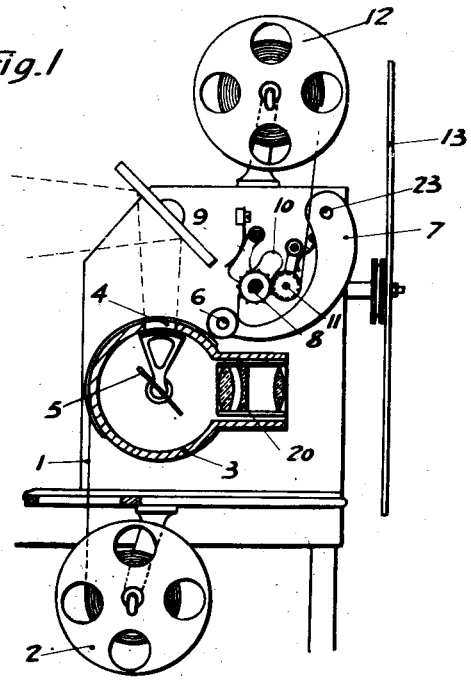
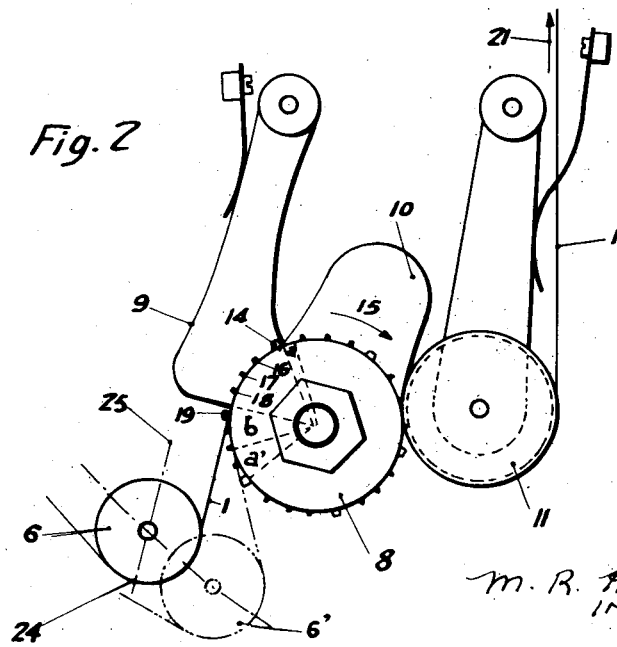

Feb. 23, 1937.  M. R. HUC  2,071,878
CINEMATOGRAPHIC APPARATUS
Filed Oct. 18, 1933   2 Sheets-Sheet 2
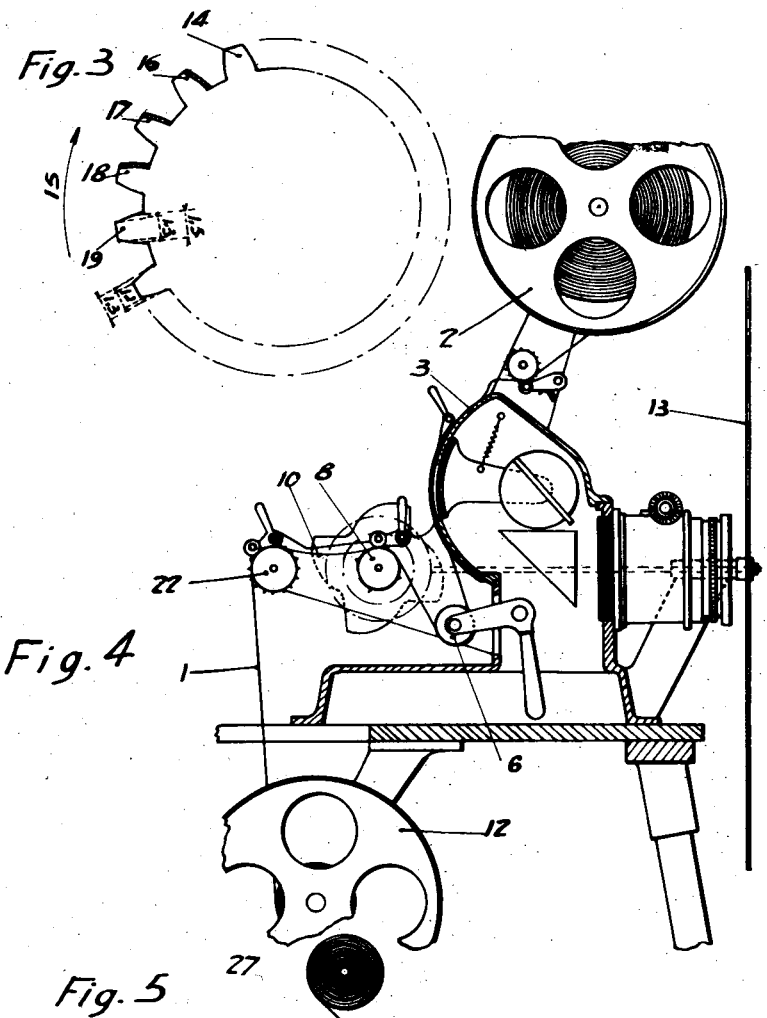
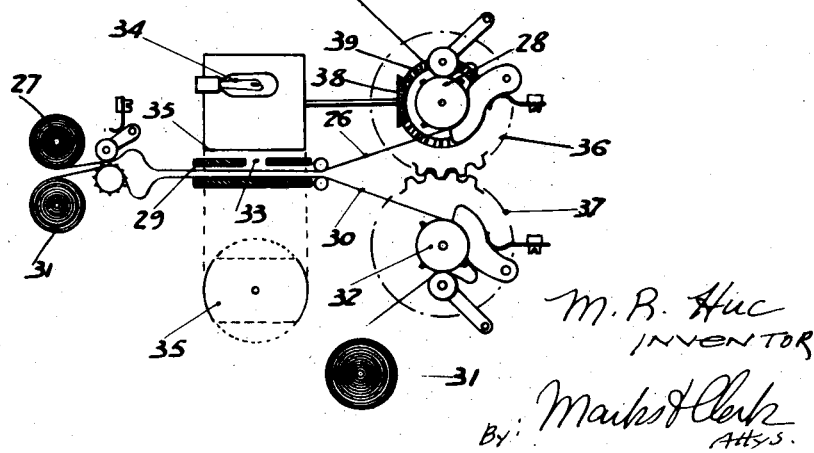
M. R. Huc
INVENTOR
By Marks & Clerk
Attys.

Patented Feb. 23, 1937

2,071,878

UNITED STATES PATENT OFFICE 2,071,878

CINEMATOGRAPHIC APPARATUS

Marcel Remy Huc, Courbevoie, France

Application October 18, 1933, Serial No. 694,153
In France October 24, 1932

14 Claims. (Cl. 88—16.8)

It is a well known fact that one of the greatest difficulties to be overcome in cinematographic apparatuses such as view taking, projection and printing apparatuses wherein the film is unwound in a continuous manner, resides in the progressive shrinking of the film and consequent modification of the pitch of its perforation. When the pitch of the perforation is equal to the pitch of the teeth on the driving sprocket, the movement is a uniform one and the optic or the like compensation therefor may be provided accurately. But, this condition being satisfied when the film is new, it is no longer satisfied when the film has shrunk. When the drum teeth engage or disengage the perforations, jerks arise which produce a blurred and wavy projection and all the more so when the shrinking is more considerable.

The older methods used for "correcting the film pitch" which only reduce the blurring by one half are generally complicated or else require manual operation.

My invention has for its object a device for making up for such effects of the shrinking, which is together self-controlled, perfectly accurate and very simple. It also is adapted to provide perfect clearness in projection whatever the shrinkage may be, without any addition of a complementary part being required in the apparatus used.

In accompanying drawings given by way of example Fig. 1 is an elevational view partly in cross-section of an apparatus of the type disclosed in my prior specification No. 1,808,603 to which my invention has been applied.

Fig. 2 is a side view of the film-driving mechanism thereof.

Fig. 3 is an end view of a form of execution of the driving drum.

Fig. 4 shows a modification of Fig. 1.

Fig. 5 shows the invention applied to a printing machine.

In Fig. 1 the film I fed by the feed drum 2 is shown entering the cylindrical guideway 3 provided with a gate 4 and containing the optic compensation means including the rocking mirror 5. The framing of the film picture is ensured by a cylinder 6 carried by a rocking lever 7. The film passes then over a toothed driving drum 8 against which it is brought to bear by the shoe 9. From the drum 8 the film makes a loose loop 10 before it returns on to the drum 8 against which it is again applied by the smooth drum 11. The film lastly is rewound on the take-up reel 12. The shutter is shown at 13 and the object glass at 20.

I may advantageously provide a loose loop in the film between the reel 2 and the gate 4 so as to prevent the irregular unwinding of the feed reel from affecting the film which is subsequently braked by the shoe 9 before it passes in front of the gate 4.

As stated hereinabove, if the perforation pitch of film I is equal to the pitch of the driving teeth of drum 8, the progress of the film will be a uniform one and the optic compensation thereof may be provided accurately.

New films having a pitch of 18.9 mm. and the drum unwinding say five pictures per revolution, the above condition will be satisfied with a drum having a periphery of 18.9×5 mm. i. e. a diameter of 30.08 mm.; such a drum will be termed hereinafter a normal drum.

When, after a certain time, the pitch has fallen underneath 18.9 mm. the projection becomes more and more blurred and wavy: each time (Fig. 2) the film edge disengages a tooth 14 the film cannot reengage the following tooth (or pair of teeth on the same generatrix of the drum 16) and remains a moment stationary. Consequently the film slips slightly over the drum in a direction opposed to the arrow 15 corresponding to the peripheral progress of the drum. For this reason it is preferable to use in all types of apparatuses provided for the continuous drive of standard films only one tooth or pair of cooperating teeth per picture so as to reduce to one the number of relative slips between the film and the drum. This is provided in the case shown by omitting the teeth 16, 17, 18 and retaining only the teeth 14—19. This improvement applies as well of course to all cases including that in which the teeth are arranged at any place on the periphery of the drum, say at equal distances from its edges.

This relative slip or shift being effected in this case during a very slight fraction of a revolution of the drum, I cause, according to my invention, the shutter to begin closing before the shift begins i. e. the operative shutter blade 13 (Fig. 1) has already cut off the light when the teeth 14 enter the position shown in Fig. 2. As the duration of closure of the shutter is much longer than that of the relative slip of the film, said slip will be at an end before the end of the shutter-closing so that the film is driven during its entire projection at a perfectly uniform speed equal to the peripheral speed of the drum and allowing perfect optic compensation.

Experience shows that the omission of three out of four sprocket teeth on drums for standard perforations of continuously progressing films does not show any drawback by reason of the very slight strain exerted on the film in such cases.

In those apparatuses where it is preferred to retain four teeth or pairs of teeth per length of picture, I may use a modified drum shown in Fig. 3 wherein the driving surfaces of the intermediary teeth 16, 17, 18 (Fig. 3) are pared so as to remove therefrom metal about 0.2 mm. deep. This allows the opposed surface of these intermediary teeth to serve for retaining the film 1 which is drawn forwards by the take-up reel 12 in the direction of the arrow 21 while the positive drive of the film before the loop 10 is performed by the unpared driving surfaces of the teeth 14, 19.

Moreover I may use even for these unpared teeth thicknesses which are less than those generally in use, say 1.5 mm. and 1.3 mm. instead of 1.7 mm. and 1.5 mm. In such a case the pared intermediary teeth would have thicknesses of 1.3 and 1.1 mm. (Fig. 3).

In the modification shown in Fig. 4, the film 1 after passing over the driving drum 8 forms the loop 10 and passes oved a second drum 22 before it is wound over the take-up drum 12. In this case the driving drum 8 is shown with a tooth or one pair of teeth for each picture whereas the auxiliary drum 22 is of the usual type with four pairs of teeth per picture.

Now the shrinking of the film being never greater than 2.5% I may use a drum having a diameter smaller by 3% than the diameter of the normal drum, the optic compensation means being of course calculated correspondingly with the diameter of the drum. Such a drum would be "too small" for the film and at each change of engaging teeth, the film would slip with reference to the drum no longer in a direction reverse to the direction of rotation of the drum, but in the same direction, this slip or shift being greater for newer films. If the diameter of the drum were to be intermediary between that of the normal drum and that of the last described drum and were smaller e. g. by 1% than that of the normal drum, the films which have shrunk by less than 1% would slip in the direction of the arrow 15 and the films of higher shrinkage would slip in the opposite direction. I may thus with such a drum having a diameter smaller than that of a normal drum reduce the elongation of the relative slip of the drum. But special provision must be made for the framing cylinder 6 in this case. When a normal drum is used and the shutter is already closed, the tooth 14 begins moving from underneath the shoe 9 (Fig. 2) and the film slips against the direction of the arrow 15 while the tooth 14 moves through a certain angle $a$. Consequently the position of the axis of the framing cylinder 6 on its path which is a circle having as a center 23 does not effect operation as the slipping of the film certainly occurs while the shutter is closed.

On the contrary, with a drum having a diameter smaller by 3% than that of a normal drum, the slip in the direction of the arrow 15 is at an end when the leading surfaces of the teeth arrive at the point of tangency of the film with the drum i. e. when the teeth 19, in the case where the framing cylinder 6 is positioned as shown in full lines in Fig. 2, are in the position shown. If the cylinder is in the position shown in dotted lines at 6' the slip will be at an end when the leading surface of the teeth has arrived on the drum radius passing through the corresponding point of tangency or arrival of the film on the drum. The two points of tangency considered are spaced through an angle $b$. Supposing the two positions shown 6 and 6' for the framing cylinder are its extreme positions the duration of travel through the angle $b+a'$ ($a'$ being the angle of slip of the film) must be shorter than the time during which the shutter is closed. This implies in the case of a five-picture drum that the angle $b+a'$ should be smaller than 1/20 of the entire circumference when the closing is a "quarter" closing.

As such a condition may be inconvenient, it is of advantage to constrain the framing cylinder 6 to move along a straight line parallel to the film portion shown in dotted lines so as to make $b$ equal to zero or at least a curve approximating such a straight line, so that $b$ may be very small.

The above shows that as the slip of the film is to occur during the closing of the shutter, there should be an accurate correspondence between the positions of the drum and of the shutter. Consequently the framing means based on modifications of the angular setting of the drum should be avoided.

I may add that my improved drum provided with one tooth or pair of teeth per picture length of standard films may be advantageously used in the case of continuously unwinding films in shutterless apparatuses as even then there are four times less slip.

As stated my invention is applicable to projecting and printing machines. Thus in the printing machine shown in Fig. 5, the negative 26 fed by the reel 27 is driven by the sprocket wheel 28 and passes through the channel 29 together with the film 30 to be printed, which latter is wound off the reel 31 and is driven by the sprocket wheel 32. The channel 29 is provided with a gate 33 in front of the printing lamp 34. The shutter which may be of a rotary type is shown at 35 in front and side views. The sprocket wheels 28 and 32 have teeth arranged in accordance with my invention and rotate at the same peripheral speed by reason of the intermeshing of the gear wheels 36 and 37 keyed to the same axes as the wheels 28 and 32 respectively. The sprocket wheels 28 and 32 are angularly set on their axes in a manner such that the corresponding films engage them simultaneously. The shutter operatively connected with the gear wheels 38 and 39 closes at the moment the teeth on the sprocket wheels engage the films and consequently during the slip of the latter.

The duplication of the drums or sprocket wheels is required in order to allow the shifting of teeth during obscuring to produce its best effects, as otherwise i. e. with a single sprocket wheel, there would yet remain a cause of blurring, to wit the relative slipping of the negative and unimpressed films one with reference to the other by reason of their different peripheral speed when driven in superposition by a common sprocket wheel. On the contrary when each film is driven separately this drawback cannot occur as the two films advance in perfect synchronism.

What I claim is:
1. In apparatuses wherein a cinematographic film is continuously fed, a device for avoiding the blurring produced by the jerks of the film due to the contraction thereof comprising a driving drum disposed for drawing the film, means for engaging the film on said drum in such a manner that said engagement is made only once during a displacement of the film equal to the length of one picture, a shutter adapted to cut off the luminous beam illuminating the film and means for controlling the motion of said drum in accordance with that of said shutter in such a manner that the film comes into engagement with the driving drum within the period of time required for cutting off the luminous beam.

2. In apparatuses wherein a cinematographic film is continuously fed, a device for avoiding the blurring produced by the jerks of the film due to the contraction thereof comprising a driving sprocket drum disposed for drawing the film, the distance between the sprockets of which is equal to the length of one picture, means for applying the film on said drum, a shutter adapted to cut off the luminous beam illuminating the film and means for controlling the motion of said drum in accordance with that of said shutter in such a manner that the film comes into engagement with the driving drum within the time required for cutting off the luminous beam.

3. In apparatuses wherein a cinematographic film is continuously fed, a device for avoiding the blurring produced by the jerks of the film due to the contraction thereof comprising a driving sprocket drum disposed for driving the film, and presenting four sprockets per length of picture, three of said sprockets being cut on their driving faces in such a manner that the fourth only comes into driving engagement with the film, a shoe applying the film on said drum, a shutter adapted to cut off the luminous beam illuminating the film and means for controlling the motion of said drum in accordance with that of said shutter in such a manner that the film comes into driving engagement with the driving drum within the time required for cutting off the luminous beam.

4. In apparatuses wherein a cinematographic film is continuously fed, a device for avoiding the blurring produced by the jerks of the film due to the contraction thereof comprising a driving sprocket drum disposed for drawing the film, the circumferential periphery of the drum being smaller than the product of an entire picture length by the number of pictures passing per revolution of the drum, the ratio of reduction in size being smaller than that of the maximum possible shrinkage of the film, a shutter adapted to cut off the luminous beam illuminating the film and means for controlling the motion of said drum in accordance with that of said shutter in such a manner that the film comes into engagement with the driving drum within the time required for cutting off the luminous beam.

5. In apparatuses wherein a cinematographic film is continuously fed, a device for avoiding the blurring produced by the jerks of the film due to the contraction thereof comprising a driving sprocket drum disposed for drawing the film the circumferential periphery of the drum being smaller than the product of an entire picture length by the number of pictures passing per revolution of the drum, the ratio of reduction in size being smaller than that of the maximum possible shrinkage of the film, a framing cylinder for the film, the center of which is adapted to move substantially along a line parallel to the direction of the film between said cylinder and driving drum, a shutter adapted to cut off the luminous beam illuminating the film and means for controlling the motion of said drum in accordance with that of said shutter in such a manner that the film comes into engagement with the driving drum within the time required for cutting off the luminous beam.

6. In cinematographic apparatuses, a device for the continuous feed of the film including a feed and a take up spool, projecting means adapted to illuminate the film as it passes through the gate, optical means affording compensation for the movement of the film, a framing cylinder for the film pictures, a rotary toothed drum adapted to drivingly engage the film as it passes out of the channel once for each progress of the film through a picture length, a shoe adapted to apply the film against the toothed drum, means whereby the tension on the film is slighter behind than to the front of the drum, a shutter arranged in front of the projecting device and means controlling the motion of the drum and of the shutter, the timing being such that the shutter obscures the projecting means while a tooth on the drum enters into full engagement with the film.

7. In cinematographic apparatuses, a device for the continuous feed of the film including a feed and a take up spool, projecting means adapted to illuminate the film as it passes through the gate, optical means affording compensation for the movement of the film, a framing cylinder for the film pictures, a rotary toothed drum adapted to drivingly engage the film as it passes out of the channel, the distance between the successive teeth of the drum corresponding to the length of a picture on the film, a shoe adapted to apply the film against the toothed drum, means whereby the tension on the film is slighter behind than to the front of the drum, a shutter arranged in front of the projecting device and means controlling the motion of the drum and of the shutter, the timing being such that the shutter obscures the projecting means while a tooth on the drum enters into full engagement with the film.

8. In cinematographic apparatuses, a device for the continuous feed of the film including a feed and a take up spool, projecting means adapted to illuminate the film as it passes through the gate, optical means affording compensation for the movement of the film, a framing cylinder for the film pictures, a rotary toothed drum adapted to drivingly engage the film as it passes out of the channel, the successive teeth being spaced by one quarter of the length of a picture on the film and three out of four of these teeth having their driving faces pared so that the fourth only is adapted to drivingly engage the film, a shoe adapted to apply the film against the toothed drum, means whereby the tension on the film is slighter behind than to the front of the drum, a shutter arranged in front of the projecting device and means controlling the motion of the drum and of the shutter, the timing being such that the shutter obscures the projecting means while a fourth tooth on the drum enters into full engagement with the film.

9. In cinematographic apparatuses, a device for the continuous feed of the film including a feed and a take up spool, projecting means adapted to illuminate the film as it passes through the gate, optical means affording compensation for the movement of the film, a framing cylinder for the film pictures, a rotary toothed drum adapted to drivingly engage the film as it passes out of the channel once for each progress of the film through a picture length, the circumferential periphery of the drum being smaller than the product of an entire picture length by the number of pictures passing per revolution of the drum, the ratio of reduction in size being smaller than that of the maximum possible shrinkage of the film, a shoe adapted to apply the film against the toothed drum, means whereby the tension on the film is slighter behind than to the front of the drum, a shutter arranged in front of the projecting device and means controlling the motion of the drum and of the shutter, the timing being such that the shutter obscures the projecting means while a tooth on the drum enters into full engagement with the film.

10. In cinematographic apparatuses, a device for the continuous feed of the film including a feed and a take up spool, projecting means adapted to illuminate the film as it passes through the gate, optical means affording compensation for the movement of the film, a rotary toothed drum adapted to drivingly engage the film as it passes out of the channel once for each progress of the film through a picture length, a framing cylinder for the film pictures, the center of which is adapted to move substantially along a straight line parallel to the direction of the film between said cylinder and driving drum, a shoe adapted to apply the film against the toothed drum, means whereby the tension on the film is slighter behind than to the front of the drum, a shutter arranged in front of the projecting device and means controlling the motion of the drum and of the shutter, the timing being such that the shutter obscures the projecting means while the tooth on the drum enters into full engagement with the film.

11. In cinematographic apparatuses, a device for the continuous feed of the film including a feed and a take up spool, optical means affording compensation for the movement of the film, a rotary toothed drum adapted to drivingly engage the film as it passes out of the channel once for each progress of the film through a picture length, a shoe adapted to apply the film against the toothed drum, means whereby the tension on the film is slighter behind than to the front of the drum, a shutter adapted to cut off the luminous beam illuminating the film and means controlling the motion of the drum and of the shutter, the timing being such that the shutter cuts off the luminous beam while a tooth on the drum enters into full engagement with the film.

12. In cinematographic apparatuses, a device for continuous feed of the film including a feed and a take up spool, optical means affording compensation for the movement of the film, a rotary toothed drum adapted to drivingly engage the film as it passes out of the channel, the distance between the successive teeth of the drum corresponding to the length of a picture on the film, a shoe adapted to apply the film against the toothed drum, means whereby the tension on the film is slighter behind than to the front of the drum, a shutter adapted to cut off the luminous beam illuminating the film and means controlling the motion of the drum and of the shutter, the timing being such that the shutter cuts off the luminous beam while a tooth on the drum enters into full engagement with the film.

13. In cinematographic apparatuses, a device for the continuous feed of the film including a feed and a take up spool, optical means affording compensation for the movement of the film, a rotary toothed drum adapted to drivingly engage the film as it passes out of the channel, the successive teeth being spaced by one quarter of the length of a picture on the film and three out of four of these teeth having their driving faces pared so that the fourth only is adapted to drivingly engage the film, a shoe adapted to apply the film against the toothed drum, means whereby the tension on the film is slighter behind than to the front of the drum, a shutter adapted to cut off the luminous beam illuminating the film and means controlling the motion of the drum and of the shutter, the timing being such that the shutter cuts off the luminous beam while a fourth tooth on the drum enters into full engagement with the film.

14. In cinematographic apparatuses, a device for the continuous feed of the film including a feed and a take up spool, optical means affording compensation for the movement of the film, a rotary toothed drum adapted to drivingly engage the film as it passes out of the channel once for each progress of the film through a picture length, the circumferential periphery of the drum being smaller than the product of an entire picture length by the number of pictures passing per revolution of the drum, the ratio of reduction in size being smaller than that of the maximum possible shrinkage of the film, a shoe adapted to apply the film against the toothed drum, means whereby the tension on the film is slighter behind than to the front of the drum, a shutter adapted to cut off the luminous beam illuminating the film and means controlling the motion of the drum and of the shutter, the timing being such that the shutter cuts off the luminous beam while a tooth on the drum enters into full engagement with the film.

MARCEL REMY HUC.